US008637753B2

(12) United States Patent
Zelinsky

(10) Patent No.: US 8,637,753 B2
(45) Date of Patent: Jan. 28, 2014

(54) GUITAR NECK

(76) Inventor: Dean Zelinsky, Highland Park, IL (US)

( * ) Notice: Subject to any disclaimer, the term of this patent is extended or adjusted under 35 U.S.C. 154(b) by 19 days.

(21) Appl. No.: 13/347,337

(22) Filed: Jan. 10, 2012

(65) Prior Publication Data

US 2012/0174730 A1 Jul. 12, 2012

Related U.S. Application Data

(60) Provisional application No. 61/431,502, filed on Jan. 11, 2011.

(51) Int. Cl.
*G01D 3/00* (2006.01)

(52) U.S. Cl.
USPC .......... 84/293

(58) Field of Classification Search
USPC .......... 84/267, 290, 291, 293
See application file for complete search history.

(56) References Cited

U.S. PATENT DOCUMENTS

| | | | | |
|---|---|---|---|---|
| 3,392,618 | A * | 7/1968 | Pelensky | 84/267 |
| 5,239,908 | A * | 8/1993 | Attias | 84/267 |
| 5,337,643 | A * | 8/1994 | Cantrell | 84/293 |
| 2005/0109196 | A1* | 5/2005 | Whiteside | 84/722 |
| 2012/0111174 | A1* | 5/2012 | Portalet | 84/293 |

* cited by examiner

*Primary Examiner* — Kimberly Lockett
(74) *Attorney, Agent, or Firm* — Husch Blackwell LLP

(57) ABSTRACT

Some or all, of the surface area of the back neck of a guitar is reduced to for a continuous geometric pattern, with spaced depressions or raised ridges, leaving less surface area for the palm of the hand and/or thumb to contact, thereby reducing or eliminating tackiness so that the grip on the neck can be better controlled.

12 Claims, 5 Drawing Sheets

GUITAR NECK

This invention relates to stringed musical instruments, such as guitars, and more particularly to necks for such stringed instruments.

BACKGROUND OF THE INVENTION

Stringed instruments traditionally have been constructed of wood, but also have been fabricated from plastics, molded composite materials, and combinations of such materials. A conventional stringed instrument can be electric as shown in FIG. 1, or acoustic (not shown) and typically includes a body 10, a neck 12, a head 14 (sometimes called a "headstock"), a heel 26, a sound board 16, a fingerboard 18 (sometimes called a "fret board"), strings 20, a bridge 22 and a sound hole (not shown). In acoustic stringed instruments the interior of body 10 is hollow, and forms a resonant cavity, often called a "sound chamber." In acoustic stringed instruments, the vibration of strings 20 is transmitted through bridge 22 to the body via sound board 16. In turn, the vibration of sound board 16 vibrates air inside the sound chamber, and produces the sound that is projected from the sound hole. In electric guitars, the body is usually solid, and can be wood or molded plastic. Pickups 24, and control knobs 28 can also differentiate the electric guitar from acoustic guitar, but in general everything else is the same.

In many conventional stringed instruments, the various components are constructed separately, and then joined to form a finished instrument. Because the structural integrity of a stringed instrument affects the tonal quality and sound output of the instrument, stringed instruments made from separately joined parts experience some loss in sound quality. In addition, in many conventional stringed instruments, the neck 12 and head 14 are made of solid wood preferably mahogany or rosewood, but other woods, such as maple, koa, wenge, ash or walnut can be used, which decreases the volume and tonal range of the instrument because the added weight dampens resonance.

SUMMARY OF THE INVENTION

The subject invention comprises a method for the construction of a guitar neck that will alleviate the tackiness or "stick" that can exist on the back of a guitar neck, and the guitar neck so constructed. Playing a guitar involves sliding the hand of the player up and down the neck. Should the guitar neck be tacky because of the particular finish on the back, performance of the player might suffer.

Applicant has found that if some or all of the surface area of the back neck were reduced, with spaced depressions or raised ridges, leaving less surface area for the palm of the hand and/or thumb to contact, then tackiness can be reduced or eliminated, and the grip on the neck can be better controlled through the single use of the thumb.

CONCISE DESCRIPTION OF THE DRAWINGS

DETAILED DESCRIPTION OF THE INVENTION

By the subject invention, the surface area of the back side of the guitar neck opposite the frets is reduced by inscribing, or engraving repeating geometric patterns thereon. Such engraving may preferentially be done by a process known to those skilled in the art as laser engraving. With this process the depth of the depressions may be controlled by a dot system, that is, a white dot allows no penetration, a black dot allows the greatest penetration and thus deepest cut, while a gray dot allows less penetration. In addition, a CNC (computer numerical control) router may be used, in which the desired design is composed on a computer and then the design is cut using a router. Other means for forming the geometric patterns may be employed, such as embossing or impressing a plastic overlay with the desired pattern and adhesively securing it the back of the neck. In this manner, it would be possible to substitute different overlays with different patterns or designs to change the sliding properties as desired.

Various examples of a guitar neck engraved according to the subject invention are depicted in the Figures. FIG. 3 shows a diamond engraving, with a modified diamond pattern. FIGS. 2, 6-7 and 9-14 show additional possible patterns. Each of the patterns comprises a series of ridges or depressions forming high and low spots, where the high spots comprise the contact area for the hand. In this manner the contact surface area of the neck is reduced in a uniform manner. Such patterns should be formed to cover substantially the entire rear side of the neck, from the head of the guitar to the body of the guitar.

The finish of that side of the neck opposite the frets also is considered important to the subject invention as a method of controlling the "glide" and friction of the fingers up and down the neck. If it is a glossy finish, is used, then the finish can be slightly tacky, or sticky, and the hand and fingers will slide less smoothly and with more effort. If a satin finish, is used, then a slicker and easier glide of the hand on the neck is possible.

Figure 6:
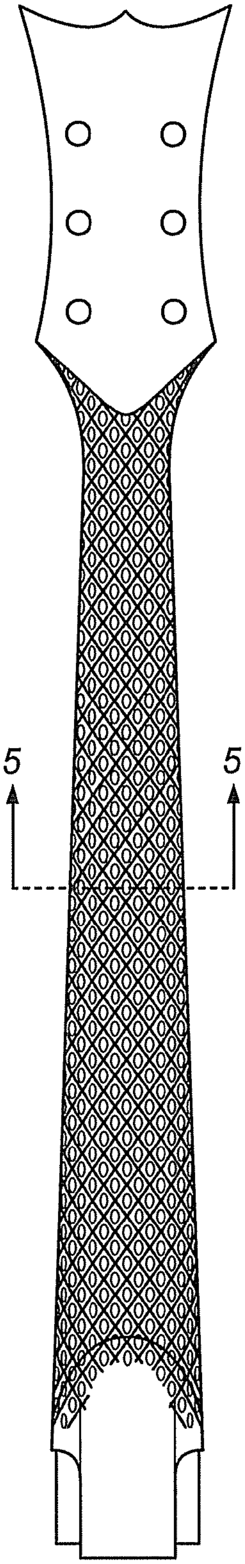
Figure 10:
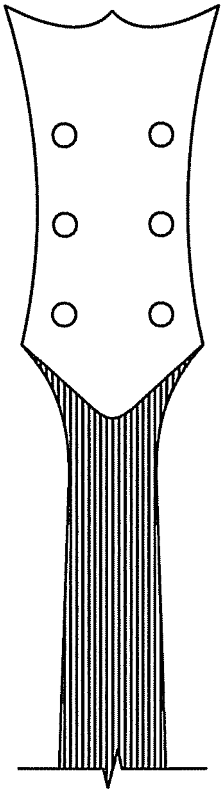
Figure 11:
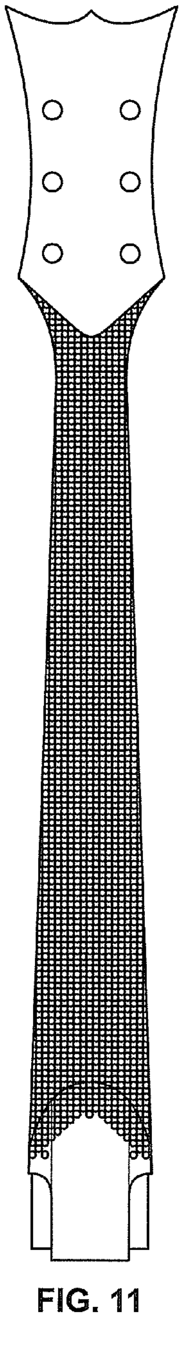
Figure 12:
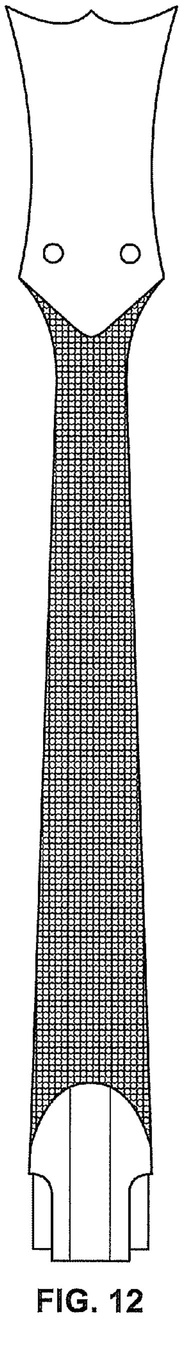
Figure 13:
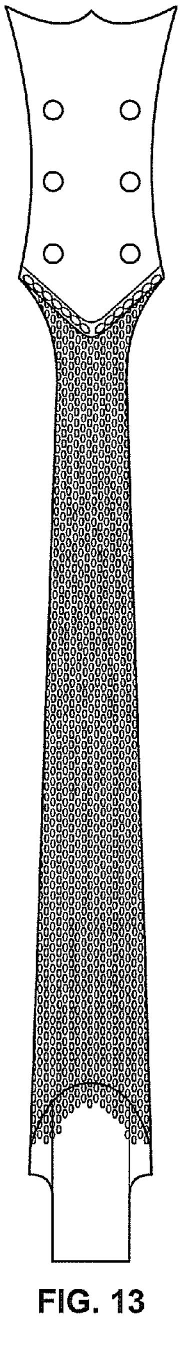

FIG. 6 shows a neck with more surface area available and thus a slower glide of the hand on the neck. FIG. 10 shows the simple design of parallel ridges, which surface area, dependent primarily on the width of the ridge and the spacing between the ridges, can be easily controlled by manipulation of these two factors. In this manner, the glide can be customized to a user's specifications. Similarly, by controlling the size of the pattern, the surface area available for contact with the hand can be increased or decreased, thereby controlling the glide of the hand in its movement up and down the neck.

With the laser engraved guitar necks of the subject invention, the tackiness of prior art guitar neck finish can be reduced and the glide of the hand on the neck can be better controlled.

In addition to a geometric pattern, other patterns can be employed for the same effect. Thus an ornamental design may be used, as well as a random pattern. It is believed that a repetitive, geometric pattern is optimal. In particular, the parallel ridge and furrow design of FIG. 10 has been found to control the glide of the hand on the neck well.

It is believed that 45% to 75% of the surface area should be removed for optimal effect. More preferably, 52% to 72% of the surface area and most preferably, 55%-65% of the surface should be removed. It is within these ranges that the ridges or crests (the high spots) maintain sufficient contact with the hand, deny contact with the lower areas of the surface, and yet reduce friction with the sliding hand. The pattern is engraved on the backside of the neck preferably on the entire area on which the hand plays, i.e., from the head to the heel.

Figure 1:
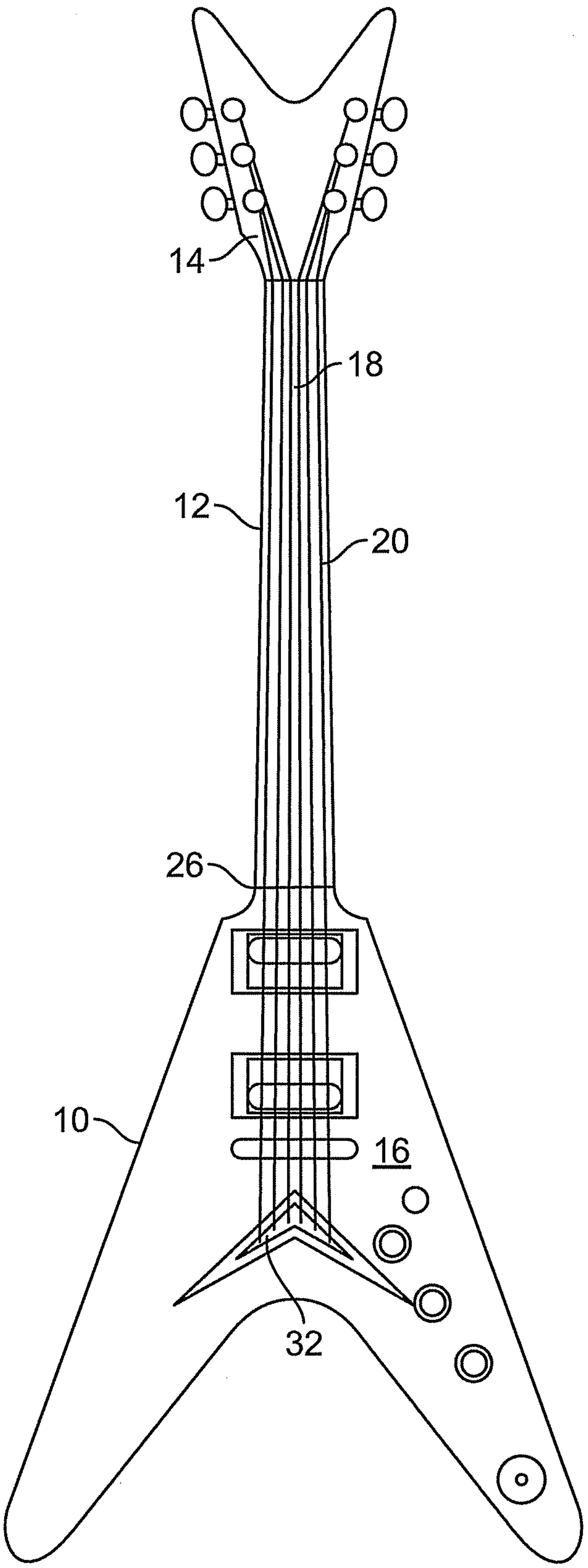
FIG. 1 is a plain view of a conventional guitar.
Figure 2:
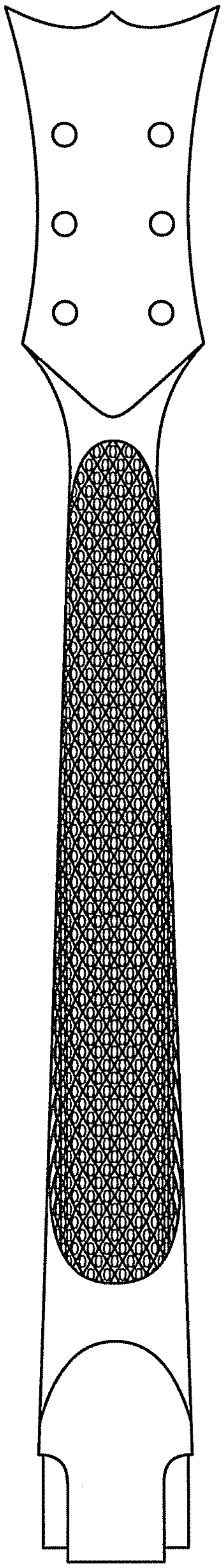
FIG. 2 is one embodiment of the inventive pattern placed on a neck of a stringed instrument.
Figure 3:
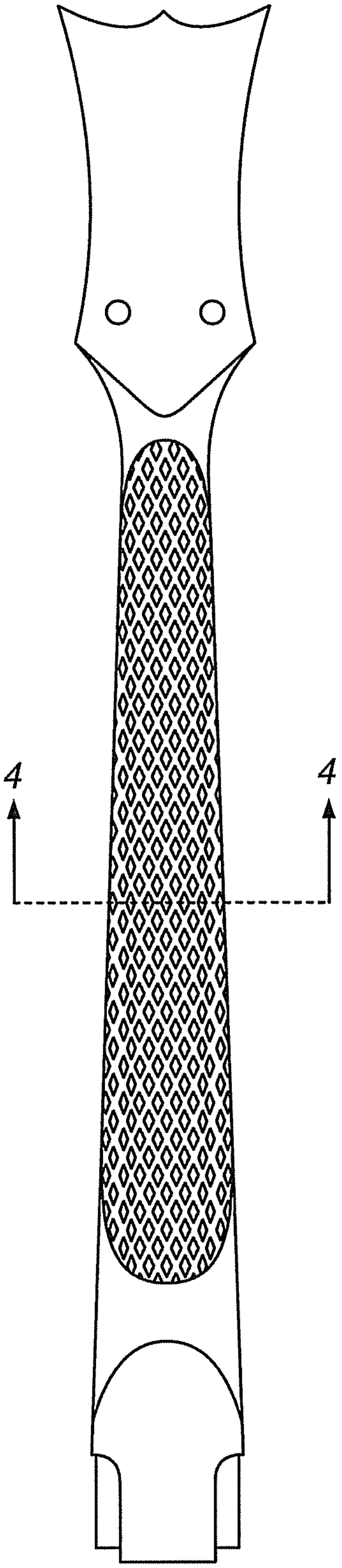
FIG. 3 is another embodiment of the inventive pattern placed on a neck of a stringed instrument.
Figure 4:
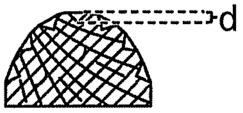
FIG. 4 is a cross section taken along the lines 4-4 of FIG. 3.

In one embodiment, such as FIGS. 2 and 3, a geometric figure is cut, leaving the uncut surface as the high spot or contact surface, and the geometric figures such as a diamond or circle cut out area is the low spot or depression.

Figure 7:
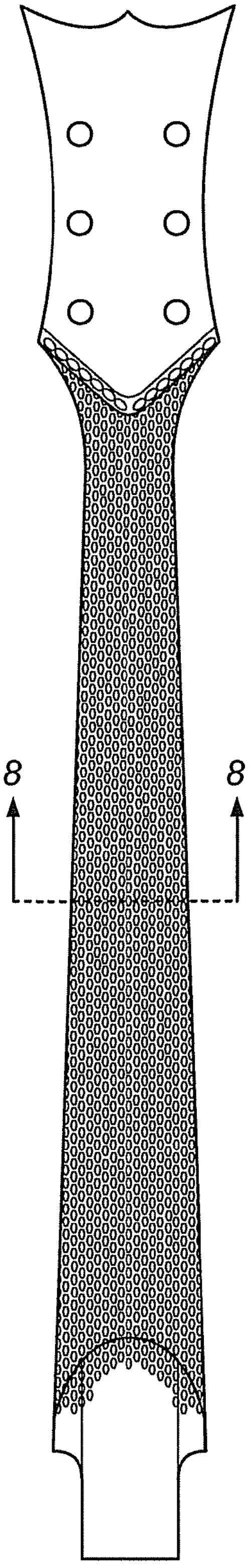
Figure 14:
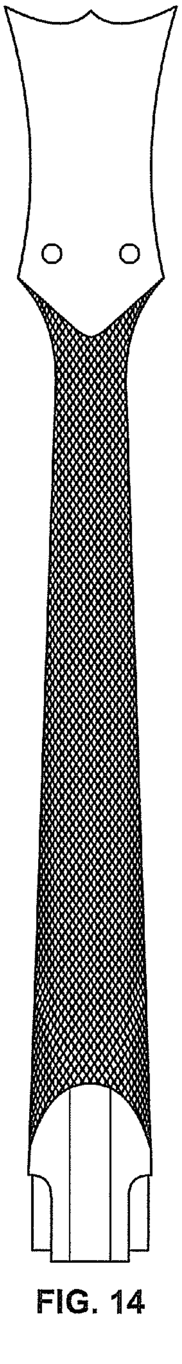

In the alternative the high spots might be the geometric figures formed by the engraved lines, where the engraved lines then become the low spots. This is best shown in FIGS. 6 and 7. As stated, the lines and the geometric figure might both contribute the low spots, while the material that has not been cut is the high spot. This is shown in FIG. 14.

Figure 5:
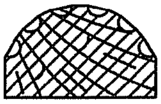
FIG. 5-14 are other embodiments of the inventive pattern placed on a neck of a stringed instrument.
Figure 8:
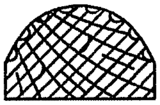
Figure 9:
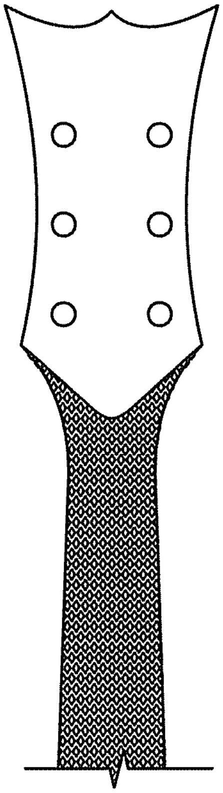

When engraving the pattern on the neck, the depth of the depression, shown as "d" in FIGS. 3, 5 and 8 should be controlled to between 0.020" to 0.040", and preferably 0.027" to 0.038". More preferably the depth of the engraved depression (low spots) should be 0.034" to 0.038". When the lines leave the geometric figure as the high spot, as in FIGS. 7 and 9, the depth of the depression as shown in FIG. 8, would be the same. The width of the "lines" is preferably 0.050" to 0.060", with the spacing between the lines about 0.110" to 0.140".

The interface between the ridges and depressions should not be sharp with sharp edges, but rather slightly rounded edges.

While the reduction of surface area contributes to the reduced friction of the hand on the neck, it is also thought that combination of the ridges and depressions serve to direct the sweat and/or body oils into the depression and away from the surface or contact area of the neck, thereby maintaining a consistent "feel" of the necks, and reducing the tendency to become tacky. Further, when a thumb is pressed against the back of the neck, the subject pattern provides added grips for instant control of the gliding of the hand on the neck.

While a preferred embodiment of a guitar has been described, various modifications, alterations, and changes may be made without departing from the spirit and scope of the present invention as defined in the appended claims.

The invention claimed is:

1. A neck for a guitar with a surface area, and having 45% to 75% of the surface area removed on a rear side of the neck to form a plurality of discrete high spots and low spots from a head of the guitar to a body of the guitar, said high spots and low spots forming a pattern.

2. The guitar neck of claim 1, wherein the removal of the surface area results in a geometric pattern.

3. The guitar neck of claim 1 where 52% to 72% of the surface area is removed.

4. The musical stringed instrument of claim 1 wherein the high spots and the low spots are ridges and depressions formed by laser engraving.

5. The musical stringed instrument of claim 1 wherein the high spots and the low spots are ridges and depressions formed by embossing or impressing.

6. The musical stringed instrument of claim 1 wherein the pattern is a diamond pattern.

7. The musical stringed instrument of claim 1 wherein the low spots are formed by the removal of portions of the reverse side of the neck.

8. The musical stringed instrument of claim 1 wherein the low spots comprise a geometric figure.

9. The musical stringed instrument of claim 1 wherein the high spots comprise a geometric figure.

10. The musical stringed instrument of claim 1 wherein the pattern is an oval pattern.

11. The musical stringed instrument of claim 1 wherein the pattern is formed of circles.

12. The musical stringed instrument of claim 1 wherein the pattern extends from a head to a heel of the guitar.

* * * * *